Jan. 5, 1943.  A. G. McNEILL ET AL  2,307,419
COMBINED GOGGLE AND GOGGLE CASE
Filed Oct. 19, 1940
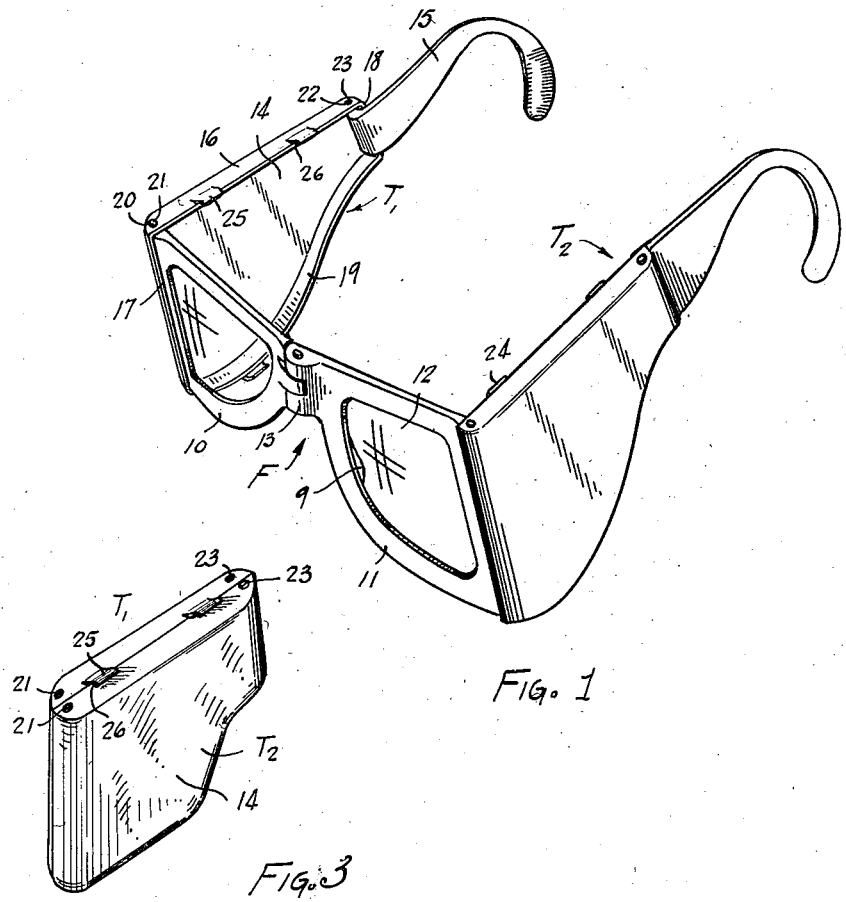
Fig. 1
Fig. 3
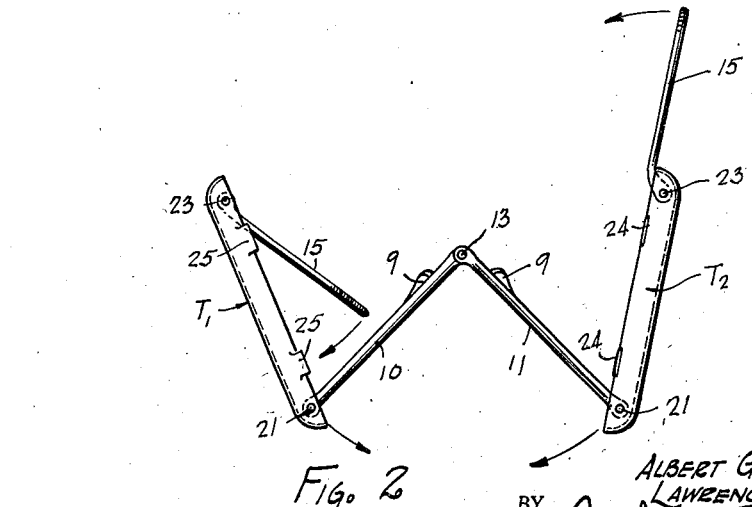
Fig. 2
INVENTORS
ALBERT GEORGE McNEILL &
LAWRENCE NILES OLSEN
BY
Joshua H. Potts
ATTORNEY Patented Jan. 5, 1943

2,307,419

UNITED STATES PATENT OFFICE 2,307,419

COMBINED GOGGLES AND GOGGLES CASE

Albert George McNeill and Lawrence Niles Olsen, Philadelphia, Pa., assignors to Bachmann Brothers, Inc., Philadelphia, Pa., a corporation of Pennsylvania Application October 19, 1940, Serial No. 361,826

6 Claims. (Cl. 2—14)

This invention relates to goggles and is concerned primarily with the provision of a combined goggles and goggles case.

At the present time the field of use of various types of goggles is being widely expanded. Aside from regular eyeglasses, goggles are now being used more and more as protective glasses to guard the user's eyes against flying particles of material, and also to safeguard the user's eyes from the harmful effects of the rays of the sun. With this ever increasing use of the goggles it becomes desirable to provide an arrangement by which a pair of goggles may be carried about without danger of damaging the goggles, and also with a reasonable degree of convenience. Thus this invention has in view, as its foremost objective, the provision of a pair of goggles which includes elements that constitute an enclosure or protective casing for other elements of the goggles.

A pair of goggles ordinarily includes a spectacle frame that functions as the lens holder, and which includes a nose bridge. Carried at each side of the spectacle frame is a temple which is ordinarily hingedly connected to the frame. An important object of the present invention is the provision of a pair of goggles of the character above outlined in which the spectacle frame comprises two lens holders which are hingedly joined together at the nose bridge. Each of the temples is also of a two part construction with the two parts hingedly connected together, and one of the temple parts is designed to function as a casing for enclosing the other temple part and the adjacent lens holder.

More in detail this invention has, as an object, the provision of a pair of goggles of the character above outlined in which one of the temple parts, and particularly that which is next adjacent to the lens holder, is provided with peripheral flanges whereby said lens holder part and the other temple part may be received within the flange construction.

Yet another detailed object of the invention is the provision of a pair of goggles of the type aforesaid in which the flange structure of the temple parts are provided with snap fastening means whereby the temple casing parts may be maintained in an assembled relation with the lens holder and other temple parts therewithin.

With those types of goggles designed for protective purposes it is important to provide guards or shields at the sides of the lens holders. This protects the user's eyes from flying particles of material and dust. The above outlined arrangement in which the temple parts immediately adjacent the lens holders function also as casing parts particularly lends itself to this feature of providing side shields. It is obvious that these temple parts must be sufficiently large to receive the lens holders, and because of this extent they are further peculiarly adapted to effectively function as shields.

It is evident that with the lens holders foldable within the temple casing parts, and with the other temple parts also foldable within the temple casing parts, and further with the temple casing parts held together in assembled relation it is possible to fold a pair of goggles into a small compact formation which may be readily carried about during periods of nonuse with the likelihood of damage to the goggles reduced to a minimum, and the goggles are maintained readily accessible with a high degree of convenience.

Various other more detailed objects and advantages of the invention will in part become apparent, and in part be hereinafter stated, as the description of the invention proceeds.

The invention, therefore, comprises a pair of goggles which consists of a spectacle frame made up of two lens holders which are hingedly connected at the nose bridge. Each of the lens holders, of course, carries a suitable lens, and a temple is hingedly connected at the side of each lens holder. Each temple comprises a temple casing part and an ear piece which are pivotally connected together. Each temple casing part is of a flanged construction which is adapted to receive the ear piece and lens holder which are hingedly connected thereto. Snap fastening means are provided for yieldably maintaining one temple casing part assembled with the other parts of the goggles enclosed therebetween.

For a full and more complete understanding of the invention reference may be had to the following description and accompanying drawing, wherein Figure 1 is a perspective view of a pair of goggles made in accordance with the precepts of this invention.

Figure 2 is a view in plan elevation showing the spectacles in a partly collapsed state. This view develops particularly the manner in which the various parts are folded to arrive at the compact formation shown in Figure 3, which is a perspective view of the goggles in the folded-up position.

Referring now to the drawing, wherein like reference characters denote corresponding parts, it is to be noted that the hereinafter described goggles may be made from any desired material, although the invention has particularly in mind the use of a thermoplastic composition which may be readily molded while hot into the shape of the various elements. Certain compositions of this type are now available and well-known to manufacturers in this field.

The goggles of this invention are shown in Figure 1 as comprising a spectacle frame referred to in its entirety by the reference character F, and a pair of temples designated $T_1$ and $T_2$. The spectacle frame F consists of a pair of lens holders 10 and 11 each of which carries an appropriate lens or protective glass designated 12. Between the lens holders 10 and 11 is a nose bridge 13, and in accordance with this invention this nose bridge 13 takes the form of the hinged joint illustrated. If desired, each of the lens holders 10 and 11 may carry nose rests shown at 9 which aid in comfortably fitting the goggles on the user's head. These nose rests 9 will preferably be made integral with the lens holders 10 and 11.

It is evident that the temple $T_1$ is intended to be the righthand temple of the goggles, while the temple $T_2$ is positioned on the lefthand side. Aside from this difference in position which the temples are designed to assume they are alike in construction, and only one of them needs here be described in detail for the purposes of this specification.

It will be noted that each of the temples $T_1$ and $T_2$ comprises a temple casing part 14 and an ear piece 15. The casing part 14 has a shape substantially corresponding to that of one of the lens holders, and is lined on its periphery by a top flange 16, front flange 17, rear flange 18, and bottom flange 19. These flanges 16, 17, 18 and 19 extend inwardly so as to define a recess in which the ear piece 15 and lens 10 may be fitted.

The top flange 16 and bottom flange 19 adjacent to the front flange 17 are formed with aligned openings 20 in which are fitted pivot pins 21 that are carried by the lens holder 10. Similarly the top flange 16 and bottom flange 19 are formed with aligned openings 22 adjacent the rear flange 18, and these openings 22 receive pivot pins 23 carried by the ear piece 15.

It is evident that the various above described parts may be assembled in a compact formation by operations in which the ear pieces 15 are first folded into position within the flange structure of the temple casing parts 14. The lens holders 10 and 11 are next folded within the casing parts, which operation, of course, involves a "breaking" of the spectacle frame F at the nose bridge 13. With these operations the goggles assume the compact formation illustrated in Figure 3.

In order to maintain this compact condition the temple casing parts 14 are provided with complemental elements of a snap fastening means. One type of snap fastener which may be employed comprises ribs or projections 24 on top flange 16 and bottom flange 19 of the temple $T_2$, while the complemental elements of the snap fastener are carried in corresponding position on the flanges 16 and 19 of the temple $T_1$. These complemental elements may take the form of leaf extensions 25 that may be integrally cast with the respective flanges, and which are formed with recesses 26 into which the ribs 24 are adapted to snap. Thus as the various parts are folded into the compact formation illustrated, the elements of the snap fastener will snap together to permit of the folding of the goggles into the compact formation with a minimum of inconvenience. The fastening effects afforded by these snap fasteners are yieldable, and the goggles are thus readily extended into their usable position.

While a preferred specific embodiment of the invention is hereinbefore set forth it is to be clearly understood that the invention is not to be limited to the exact construction illustrated and described, because various modifications of these details may be provided in putting the invention into practice within the purview of the appended claims.

We claim:

1. A pair of goggles comprising a spectacle frame made up of a pair of lens holders hingedly connected together, and a temple hingedly connected to each lens holder, each of said temples consisting of two parts hingedly connected together with one of said temple parts being adapted to receive the other temple part and the lens holder to which said temple is connected.

2. A pair of goggles of the character described comprising a spectacle frame made up of a pair of lens holders hingedly connected together, a temple hingedly connected to each lens holder, each of said temples consisting of a temple casing part and an ear piece, the said temple casing part being hingedly connected to the lens holder with the ear piece hingedly connected to the temple casing part, each of said temple casing parts being adapted to receive the lens holder and ear piece which are connected thereto, and means for yieldably maintaining said temple casing parts in assembled relation.

3. A pair of goggles of the character described comprising a spectacle frame consisting of a pair of lens holders hingedly connected together, a temple hingedly connected to each lens holder, each temple comprising a temple casing part and an ear piece hingedly connected together, each temple casing part being of a flanged construction to provide a recess that is adapted to receive the ear piece of said temple and the adjacent lens holder, and means for yieldably maintaining said temple casing parts assembled to define a casing that receives the other elements of the goggles.

4. A pair of goggles of the character described comprising a spectacle frame consisting of a pair of lens holders hingedly connected together, a temple hingedly connected to each lens holder, each temple comprising a temple casing part and an ear piece hingedly connected together, each temple casing part being of a flanged construction to provide a recess that is adapted to receive the ear piece of said temple and the adjacent lens holder, elements of snap fasteners carried by one of said temple casing parts, and complemental elements of snap fasteners on the other casing part.

5. A pair of goggles of the character described comprising a spectacle frame consisting of a pair of lens holders hingedly connected together, a temple hingedly connected to each lens holder, each temple comprising a temple casing part and an ear piece hingedly connected together, each temple casing part being of a flanged construction to provide a recess that is adapted to receive the ear piece of said temple and the adjacent lens holder, a rib carried by one of the flanges of one temple casing part, and a leaf extension carried by a flange of the other casing part and formed with a recess into which said rib is adapted to snap.

6. In the combination of a pair of goggles and protective casing the improvement which comprises a pair of flat dish-like casing members each having one open face with a surrounding flange structure, and a pair of lens holders pivotally mounted with respect to each of said members and to each other and arranged to be folded together and be swung into the open faces of said casing members with said flange structures in contact for protective purposes.

ALBERT GEORGE McNEILL.
LAWRENCE NILES OLSEN.